April 14, 1964
F. E. HANSCOM ETAL
3,128,492
DEVICE FOR CLEANING PHOTOGRAPHIC FILM BY ROTATING BRUSHES AND BY THE NEUTRALIZATION OF STATIC ON THE FILM
Filed Oct. 23, 1961
3 Sheets-Sheet 2
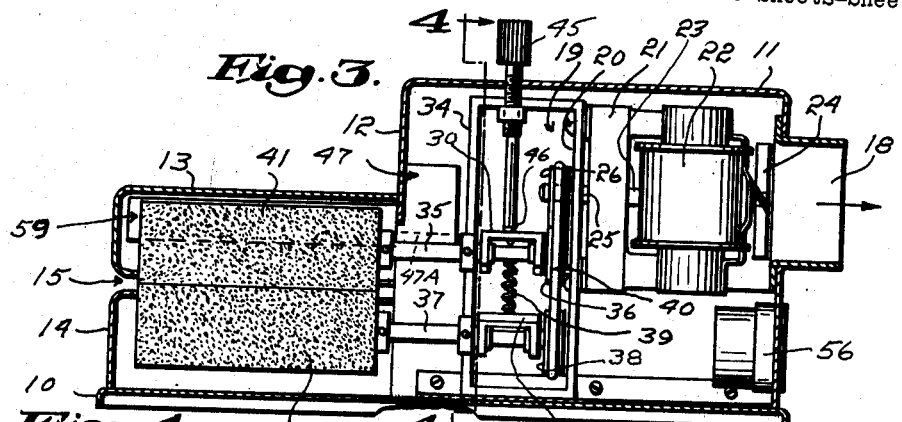
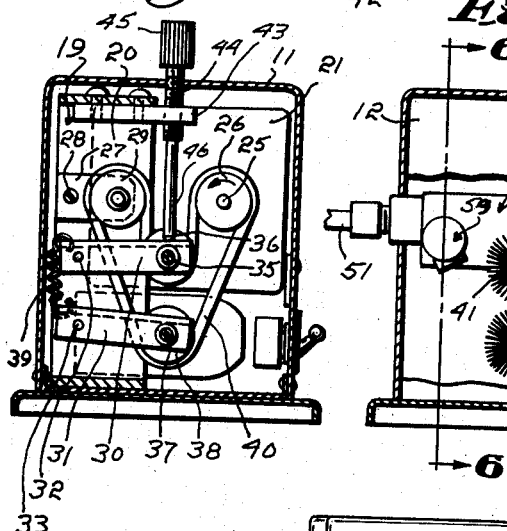
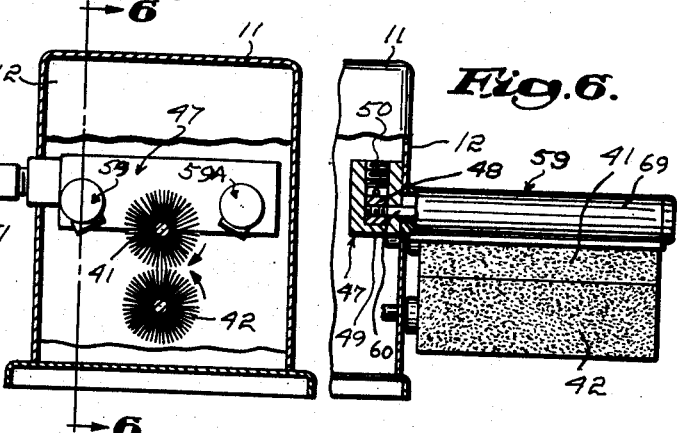
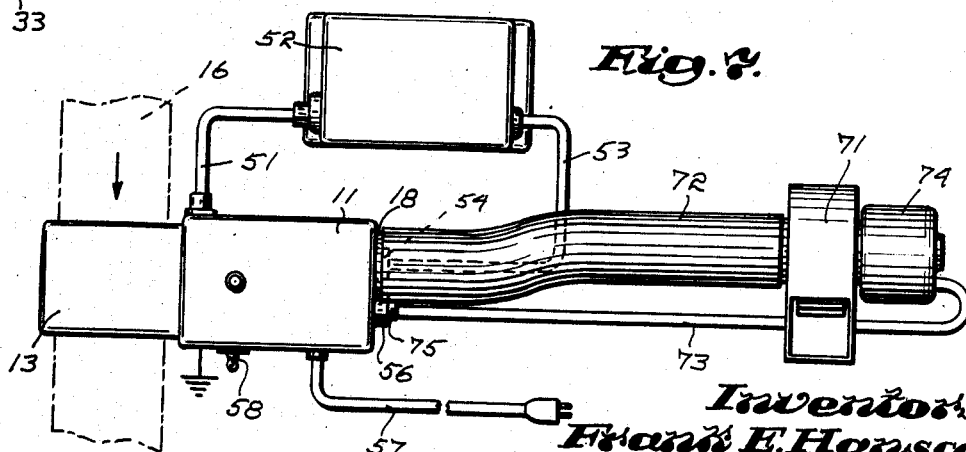
Inventors:
Frank E. Hanscom,
Donald E. Hardy,
by
Attorney April 14, 1964    F. E. HANSCOM ETAL    3,128,492
DEVICE FOR CLEANING PHOTOGRAPHIC FILM BY ROTATING
BRUSHES AND BY THE NEUTRALIZATION OF
STATIC ON THE FILM
Filed Oct. 23, 1961    3 Sheets-Sheet 3
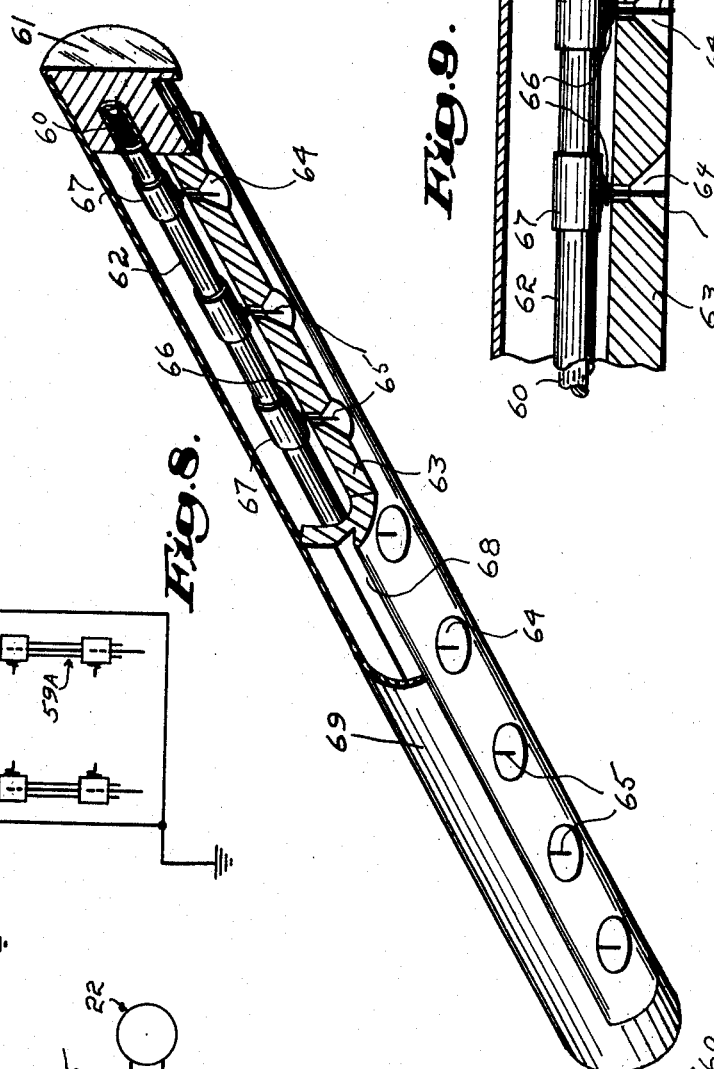
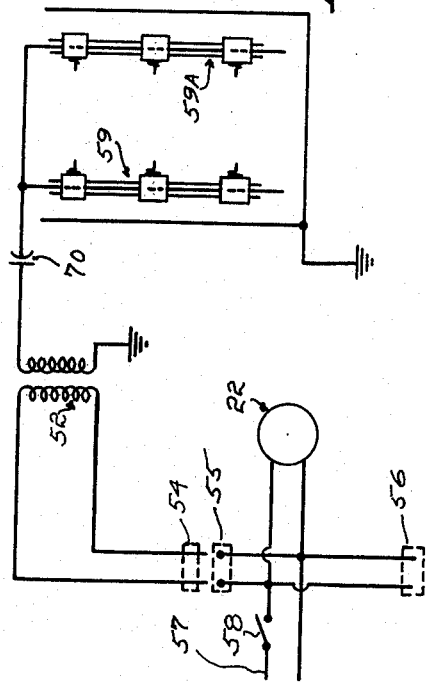
Inventors:
Frank E. Hanscom,
Donald E. Hardy,
by Abbot Spear
Attorney

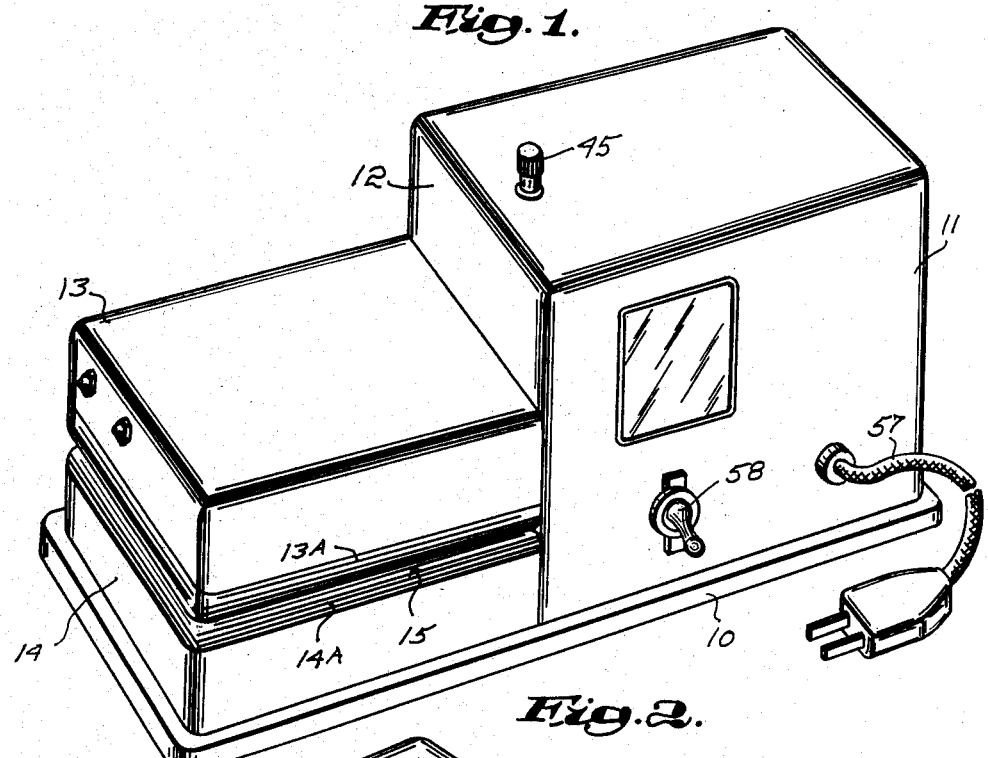
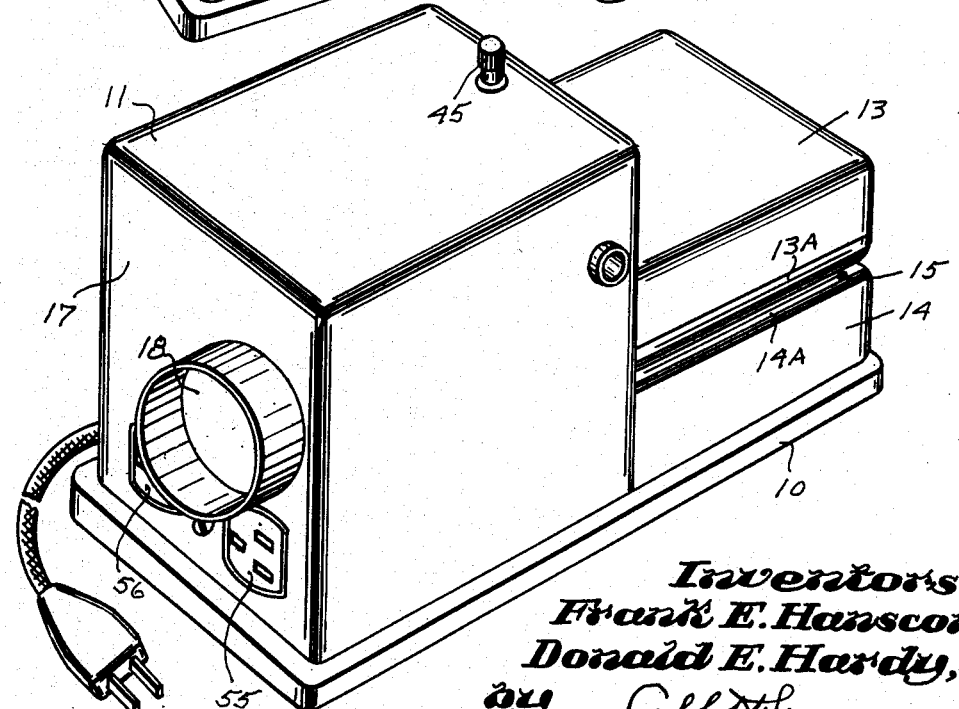

United States Patent Office 3,128,492
Patented Apr. 14, 1964

3,128,492
DEVICE FOR CLEANING PHOTOGRAPHIC FILM BY ROTATING BRUSHES AND BY THE NEUTRALIZATION OF STATIC ON THE FILM
Frank E. Hanscom, 21 Simmons Road, South Portland, Maine, and Donald E. Hardy, 311 Middle Road, Falmouth, Maine
Filed Oct. 23, 1961, Ser. No. 147,008
8 Claims. (Cl. 15—308)

The present invention relates to devices for use in cleaning the surfaces of photographic film.

One of the problems in processing photographic film is dust on the developed negative film that would show on a picture, particularly in the case of enlargements, unless the film was freed of dust particles. One difficulty in cleaning strips of such film is that static charges prevent the dust from being brushed therefrom and the principal objective of the present invention is to provide devices in which the static charges are neutralized to free the dust which is then brushed therefrom and carried away from the film zone by an air current.

This general objective is attained by a device provided with housing structure including a main portion and a pair of housing portions connected thereto. The pair of housing portions are spaced to define a slot-like passageway through which the film is to pass. A rotary brush is housed by each of the pair of housing portions and these engage each other and receive the film between them. Static electric neutralizing means extend transversely of the path of the film adjacent the brushes within one of the pair of housing portions. Preferably there are two such means, one on the infeed side of the brush and the other on the outfeed side thereof.

Another general objective of the invention is to provide a film cleaning device comprising a pair of brushes within housing structure having a slot-like, film receiving passage. The drive for the brushes includes a motor and a unit which not only supports the brush shafts but also enables their adjustment to ensure the desired relationship of the brushes relative to the film passage for the reception of the film between them and also the desired relationship of the brushes relative to each other to ensure the desired brush pressure on the film surfaces.

In this connection, one objective of the invention is to provide for the brushes being driven in engagement at slightly different speeds so that there is a self cleaning action and this objective is attained by the brush shaft supporting unit which has pulleys of different size on the brush shafts.

It is also an objective of the invention to provide an air stream across the film in the zone of the brushes and the neutralizing means. This objective may be attained as by the intake of a blower which may either have its intake in communication with the exhaust port of the main housing portion or be a blower within the main housing and driven by the drive motor and having its intake disposed toward the film receiving passage.

In the accompanying drawings there are shown illustrative embodiments of the invention from which these and other of its objectives, novel features, and advantages will be readily apparent.

In the drawings,

FIGURE 1 is a perspective view of a device in accordance with the invention as seen from the end having the pair of housing portions, FIGURE 2 is a like view showing the device as seen from the end of its main housing portion that has the exhaust port, FIGURE 3 is a vertical, longitudinal section through the device, FIGURE 4 is a section taken approximately along the indicated lines 4—4 of FIGURE 3, FIGURE 5 is a like section taken slightly to the left of the section 4—4, FIGURE 6 is a section taken approximately along the indicated lines 6—6 of FIGURE 5, FIGURE 7 is a top plan view of a device in accordance with the invention with an exhaust blower attached to the exhaust port of the main housing portion, FIGURE 8 is a partly sectioned perspective view of a neutralizer on an increased scale, FIGURE 9 is a fragmentary, longitudinal section taken on a further increased scale, and FIGURE 10 is a schematic view of the circuitry.

The device shown in the drawings has a base 10 supporting a main housing portion 11 to the front wall 12 of which are attached a pair of housing portions 13 and 14 which are vertically spaced to provide a transverse, slot-like passageway 15 for film indicated at 16 in FIGURE 7. The proximate edges of the housing portions 13 and 14 have inturned guide lips 13A and 14A which are preferably plated, chromium plating proving satisfactory, and the length of the housing portions 13 and 14 determines the maximum width of the film that can be cleaned in any particular device in accordance with the invention. The rear wall 17 of the main housing portion 11 has an exhaust port 18.

Within the main housing portion 11, there is a generally indicated rectangular frame 19 to the rear wall 20 of which is secured the casing of a speed reduction unit 21 supporting a motor 22. The forward end of the motor shaft 23 is the drive shaft of the reduction unit 21 and its rear end is shown as having a blower rotor 24 attached thereto which is operable to draw air through the passageway 15, to cool the motor and to exhaust air through the exhaust port 18. The driven shaft 25 of the reduction unit 21 extends through the rear wall 20 and is provided with a drive pulley 26.

As may best be seen in FIGURE 4, the rear wall 20 has an arm 27 attached thereto by a screw 28 enabling it to be swung up and down and locked in a desired position. The arm 27 supports a pulley 29. An upper yoke 30 and a lower yoke 31 are pivotally mounted as at 32 and 33, respectively, between the rear wall 20 and the front wall 34 of the frame 19 with the pivots supported by the front and rear walls of the frame 19. The yoke 30 has a shaft 35 carrying a pulley 36 and the yoke 21 has a shaft 37 on which there is a pulley 38. The yoke shafts and their pulleys are yieldably urged apart by a spring 39. A belt 40 is trained about the pulleys 26, 29, 36 and 38. The shafts 35 and 37 extend forwardly into the housing portions 13 and 14, respectively, and are axially connected to brushes 41 and 42, respectively, having suitably soft bristles. It will be noted that the pulley 36 is smaller than the pulley 38 so that the brushes 41 and 42 are driven at somewhat different r.p.m. ensuring their self-clearing when the brushes are in contact. The belt 40 is adjusted as to tightness by adjusting the angular position of the arm 27, which adjustment is also operative to move the lower shaft 37 vertically and to affect the spring 39 so that the upper shaft is also moved vertically in the same direction so that the position of the two brushes relative to the passageway 15 may be varied. When the arm 27 is swung upwardly, the belt 40 is tightened and the movement of the shafts 35 and 37 is upwardly and when the arm 27 is swung downwardly, to loosen the belt 40, the shafts 35 and 37 both move downwardly.

It will be noted that the frame 19 carries a fixed arm 43 through which the portion 44 of a rotatable adjusting member 45 is threaded. The member 45 extends upwardly through the housing portion 11 and its lower end 46 engages the upper yoke 30 to actuate it against the action of the spring 39. When the member 45 is turned in one direction, the brush supporting end of the yoke 30 is swung downwardly, the tension on the spring 39 is increased, and the brush supporting end of the yoke 31 is also urged downwardly but as the belt 40, under the pulley 36, is pushed downwardly, the belt 40 exerts a corresponding upward pull on the pulley 38 so that the spacing between the shaft 35 and 37 is decreased. When the member 45 is turned in the other direction, the tensioned spring 39 is operative to urge the pulleys 36 and 38 in opposite directions with the position of the pulley 36 being limited by the engagment of its frame with the lower end 46 of the member 45. The brushes 41 and 42 may be initially adjusted to interengage to establish the desired pressure on the film and later adjusted, if necessary, to compensate for brush wear to maintain that pressure.

Because of the tenacity of dust particles to film due to static electric charges, the brushes by themselves are not operative to suitably clean the film even when the direction of its movement is counter to the direction of rotation of the brushes.

For that reason, the main housing portion 11 is shown as having a transverse distributor, generally indicated at 47, and comprising a conductor 48 locked in an insulated body 49 as by a set screw 50 and coupled to a cable 51 from the transformed 52 whose lead 53 is shown as having a plug 54 entered in the socket 55 in the rear wall 17 of the housing portion 11. The socket 55 is in parallel with a socket 56 also in the rear wall 17 and both are in parallel with the motor 22 and all are connected to the lead 57 provided with a control switch 58.

A pair of static neutralizers are generally indicated at 59 and 59A. Each has a conductor 60 threaded into the conductor 48, see FIGURE 6, one on each side of the upper rotary brush 41 and parallel to its axis. Each conductor 60 has, see FIGURES 8 and 9, its outer end threaded into an end cap 61 and is covered by an insulated sleeve 62 throughout that portion which is in the channel element 63 which is also a non-conductor of electricity and has a lengthwise series of holes 64, each freely receiving a discharge point 65 whose upper end 66 is shown as in the form of a tapering coil compressed between the element 63 and a sleeve 67. The sleeves 67 are of conductive stock and are spaced lengthwise of sleeve 62 thereby to capacitatively couple the discharge points thereto. Each element 63 has a shoulder 68 on each side to receive the edges of a metal sleeve 69 which is disposed to make a good electrical connection with the front wall 12 of the main housing portion 11 to ensure a ground.

Suitable ionization of the air may be effected with a 115 volt A.C. transformer capable of delivering potential in the order of 5000 volts to the cable 51 and the transformer is shown as having a capacitor 70 designed to yield approximately 3600 volts to the series of charge points. Any other transformer, however, may be used that is designed to yield adequate voltage with a sufficiently limited current capacity.

In practice, the neutralizer 59 is operative to ensure that dust on the film is so free that it will be removed therefrom by the brushes, the air stream developed by the blower, or both, while the neutralizer 59A is operative to eliminate charges on the film on the outfeed side of the brushes that might cause dust particles to be again drawn thereto. In fact, with the neutralizing means being housed, the entire interior of the housing portions 13 and 14 is subject to their dust-freeing action. To ensure the flow of air, the distributor 47 is recessed as at 47A to receive freely the shaft 35.

When an air stream of greater effect is wanted, a separate blower 71 may be used as shown in FIGURE 7. The blower 71 may be connected to the exhaust port 18 by a conduit 72 and the lead 73 to its motor 74 is shown as having a plug 75 entered in the socket 56. With this arrangement, the motor-driven blower 24 may be dispensed with.

What we therefore claim and desire to secure by Letters Patent is:

1. In a device for cleaning the surfaces of photographic film, housing structure including a main portion and a pair of housing portions, the pair of housing portions being spaced to define a film passage slot, a pair of rotary brushes, one in one of said pair of housing portions and the other in the other housing portion of that pair, said brushes engaging one another and receiving the film between them, an elongated rigid static electric neutralizer member disposed transversely of the path of said film adjacent said brushes and within one of said pair of housing portions, a rigid insulated conductor disposed transversely of said main housing portion and supported therein and said neutralizer member is connected at one end to the conductor and supported thereby, a drive in said main housing connected to both of said brushes and including a motor, and means to create a flow of air through said slot and across the film in the zone of said brushes and neutralizer member.

2. In a device for cleaning the surfaces of photographic film, housing structure including a main portion and a pair of housing portions, the pair of housing portions being spaced to define a film passage slot, a pair of rotary brushes, one in one of said pair of housing portions and the other in the other housing portion of that pair, said brushes engaging one another and receiving the film between them, a pair of elongated, rigid static electric neutralizer members disposed transversely of the path of said film adjacent said brushes and within one of said pair of housing portions, one on the infeed side of the brushes and one on the outfeed side thereof, a rigid insulated conductor disposed transversely of said main housing portion and supported therein and said neutralizer members are connected at one end to said conductor and supported thereby, a drive in said main housing connected to both of said brushes and including a motor, and means to create a flow of air across the film in the zone of said brushes and neutralizer members.

3. In a device for cleaning the surfaces of photographic film, housing structure including a main portion and a pair of housing portions, the pair of housing portions being spaced to define a film passage slot, a pair of rotary brushes, one in one of said pair of housing portions and the other in the other housing portion of that pair, said brushes engaging one another and receiving the film between them, static electric neutralizer means disposed transversely of the path of said film adjacent said brushes and within one of said pair of housing portions, each brush including a coaxial pulley, a drive in said main housing including a belt connected to both of said pulleys and a motor, said pulleys being of different diameters whereby said drive rotates said brushes at different rates.

4. In a device for cleaning the surfaces of photographic film, housing structure including a main portion and a pair of housing portions, the pair of housing portions being spaced to define a film passage slot, a pair of rotary brushes, one in one of said pair of housing portions and the other in the other housing portion of that pair, said brushes engaging one another and receiving the film between them, static electric neutralizer means disposed transversely of the path of said film adjacent said brushes and within one of said pair of housing portions, a belt drive in said main housing connected to both of said brushes and including a motor, and means including a resilient connection between both brushes to adjust the spacing of said brushes relative to each other.

5. In a device for cleaning the surfaces of photographic film, housing structure including a main portion and a pair of housing portions, the pair of housing portions being spaced to define a film passage slot, a pair of rotary brushes, one in one of said pair of housing portions and the other in the other housing portion of that pair, said brushes engaging one another and receiving the film between them, static electric neutralizer means disposed transversely of the path of said film adjacent said brushes and within one of said pair of housing portions, and a belt drive in said main housing connected to both of said brushes, said drive also including a motor, and means including a resilient connection between both brushes to adjust the spacing of said brushes relative to each other, and means to shift said brushes simultaneously vertically in the same direction relative to said slot.

6. In a device for cleaning the surfaces of photographic film, housing structure including a main portion and a pair of housing portions, the pair of housing portions being spaced to define a film passage slot, a pair of rotary brushes, one in one of said pair of housing portions and the other in the other housing portion of that pair, said brushes engaging one another and receiving the film between them, a rigid static electric neutralizer member disposed transversely of the path of said film adjacent said brushes and within one of said pair of housing portions, a belt drive in said main housing connected to both of said brushes and including a motor and common means to shift said brushes simultaneously vertically in the same direction relative to said slot.

7. In a device for cleaning the surfaces of photographic film, means defining a pathway for the film, a pair of rotary brushes, said brushes engaging one another and receiving the film between them, and a drive connected to both of said brushes and including a motor, said drive including a frame, a drive pulley driven by said motor and an idler pulley carried by said frame, a pair of yokes pivotally carried by said frame, each yoke including a shaft connected to a respective one of said brushes and provided with a pulley, a belt interconnecting said pulleys, a spring interconnecting said yokes and yieldably urging said shafts apart, and an adjustable member engaging one of said yokes and opposing its movement by said spring.

8. In a device for cleaning the surfaces of photographic film, means defining a pathway for the film, a pair of rotary brushes, said brushes engaging one another and receiving the film between them and a drive connected to both of said brushes and including a motor, said drive including a frame, a drive pulley driven by said motor, an idler pulley, and an adjustable connection between said frame and said idler pulley, a pair of yokes pivotally carried by said frame, each yoke including a shaft connected to a respective one of said brushes and provided with a pulley, a belt interconnecting said pulleys, a spring interconnecting said yokes and yieldably urging said shafts apart, said adjustable connection being operative to change the position of said yokes relative to said frame thus to vary the position of said brushes relative to said pathway, and an adjustable member engaging one of said yokes and opposing its movement by said spring.

References Cited in the file of this patent

UNITED STATES PATENTS

| | | |
|---|---|---|
| 1,169,428 | Rogers | Jan. 25, 1916 |
| 1,199,424 | Robinson | Sept. 26, 1916 |
| 1,247,047 | Howell | Aug. 14, 1917 |
| 1,801,620 | Bettman | Apr. 21, 1931 |
| 2,204,168 | Wood | June 11, 1940 |
| 2,358,334 | Knowlton | Sept. 19, 1944 |
| 2,679,060 | Zimmerman | May 25, 1954 |
| 2,752,271 | Walkup et al. | June 26, 1956 |
| 2,980,933 | Schwartz et al. | Apr. 25, 1961 |